United States Patent [19]

Johnson

[11] Patent Number: 5,016,384
[45] Date of Patent: May 21, 1991

[54] PISTOL GRIP FISHING POLE STAND

[76] Inventor: Joseph H. Johnson, 4483 Papal Dr., Florissant, Mo. 63033

[21] Appl. No.: 576,072

[22] Filed: Aug. 31, 1990

[51] Int. Cl.$^5$ ............................................. A01K 97/10
[52] U.S. Cl. .................................................. 43/21.2
[58] Field of Search .................... 43/21.2, 23; 248/534

[56] References Cited

U.S. PATENT DOCUMENTS

| 157,716 | 3/1950 | Wortman | 43/21.2 |
| 190,330 | 5/1961 | Carothers | 43/21.2 |
| 2,724,569 | 11/1955 | Licata | 43/21.2 |
| 2,851,812 | 9/1958 | Beck | 43/15 |
| 2,985,414 | 5/1961 | Ince | 248/534 |
| 3,956,846 | 5/1976 | Kent | 43/21.2 |
| 4,031,651 | 6/1977 | Titze | 43/21.2 |
| 4,092,795 | 6/1978 | Bryant | 43/21.2 |
| 4,854,069 | 8/1989 | Smith et al. | 43/21.1 |
| 4,936,039 | 6/1990 | Huber et al. | 43/21.2 |

FOREIGN PATENT DOCUMENTS

| 150071 | 8/1920 | United Kingdom | 43/21.2 |
| 2097231 | 11/1982 | United Kingdom | 43/21.2 |

Primary Examiner—Richard K. Seidel
Assistant Examiner—Jeanne M. Elpel
Attorney, Agent, or Firm—H. Jay Spiegel

[57] ABSTRACT

The present invention relates to a pistol grip fishing pole stand. The pistol grip fishing pole stand includes a frame means which is designed to be inserted into the ground and provide support for the pistol grip fishing pole stand. The stand also includes a receptacle therewith which is adapted to receive and engage the pistol grip shaped handle of a fishing pole. The pistol grip fishing pole stand permits a fisherman to fish without having to hold a fishing pole.

5 Claims, 2 Drawing Sheets

PISTOL GRIP FISHING POLE STAND

BACKGROUND OF THE INVENTION

The present invention relates to a pistol grip fishing pole stand. In the prior art, fishing rod supports as well as pistol grip fishing poles are known. U.S. Pat. No. 1,520,543 to Meachen discloses a fishing rod support which is designed to support a fishing rod while the support member is attached to a vessel. U.S. Pat. No. 2,965,995 to Lasky discloses a fishing pole having a pistol grip handle.

Applicant is unaware of any prior art, including the two patents cited above, that teach or fairly suggest a fishing pole stand which includes a receptacle which is designed to support and retain a pistol grip fishing rod handle during fishing.

SUMMARY OF THE INVENTION

The present invention relates to a pistol grip fishing pole stand. The present invention includes the following interrelated aspects and features:

(a) In the first aspect, the pistol grip fishing pole stand includes a frame member which is designed to support the pistol grip fishing stand during use. The frame member includes two legs which are connected together at the top by a curved portion. The legs are designed to be inserted into the ground to support a fishing pole during use.

(b) The pistol grip fishing pole stand also includes a receptacle that is designed to engage and retain a pistol grip shaped handle of a fishing pole. The receptacle is oval in shape and includes two differing height portions to facilitate retention of the handle of the pistol grip fishing pole.

(c) The receptacle is attached between the two legs of the frame member at a distance from the top portion of the frame member equal to about one-third of the overall frame member length.

(d) In use, the pistol grip of a pistol grip fishing pole is placed within the receptacle, thereby allowing a fisherman to fish without having to hold the fishing pole.

Accordingly, it is a first object of the present invention to provide a pistol grip fishing pole stand.

It is yet further object of the present invention to provide a pistol grip fishing pole stand which includes a receptacle therewith which is designed to receive and engage the pistol grip handle of the fishing pole.

It is a still further object of the present invention to provide a pistol grip fishing pole stand which facilitates unattended fishing using a pistol grip fishing pole.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
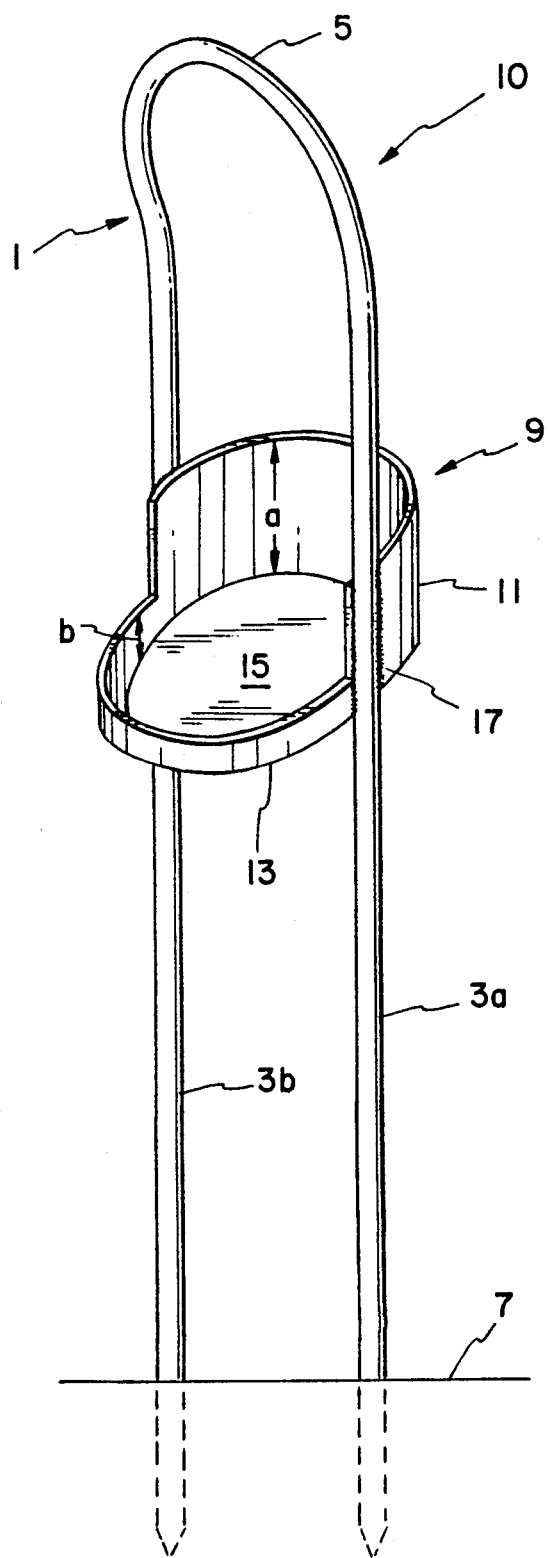
FIG. 1 shows a rear perspective view of the pistol grip fishing pole stand.

With reference FIG. 1, the pistol grip fishing pole stand is generally designated by the reference numeral 10 and is seen to include frame member 1 having legs 3a and 3b and a U-shaped curved connecting portion 5 therebetween.

The pistol grip fishing pole stand also includes a receptacle 9 which is designed to receive a pistol grip shaped handle of a fishing pole. The receptacle 9 is oval in shape and comprises a first portion 11 having a sidewall height a and a second portion 13 having a sidewall height b. As can be seen from FIG. 1, the sidewall height a of the first portion of 11 is greater than the sidewall height b of the second portion 13. The receptacle 9 also includes a base plate 15 which extends laterally between the first and second portions, 11 and 13, respectively, the base plate 15 providing a support for the bottom of the pistol grip shaped handle of a fishing pole.

The receptacle 9 is attached between the legs 3a and 3b by the weld 17. Of course, other attachments, such as clamps using screws may be utilized to secure the receptacle 9 to legs 3a and 3b.

The end portions of the legs 3A and 3B are designed to be inserted into a ground surface 7 so as to support the pistol grip fishing pole stand during use.

Figure 2:
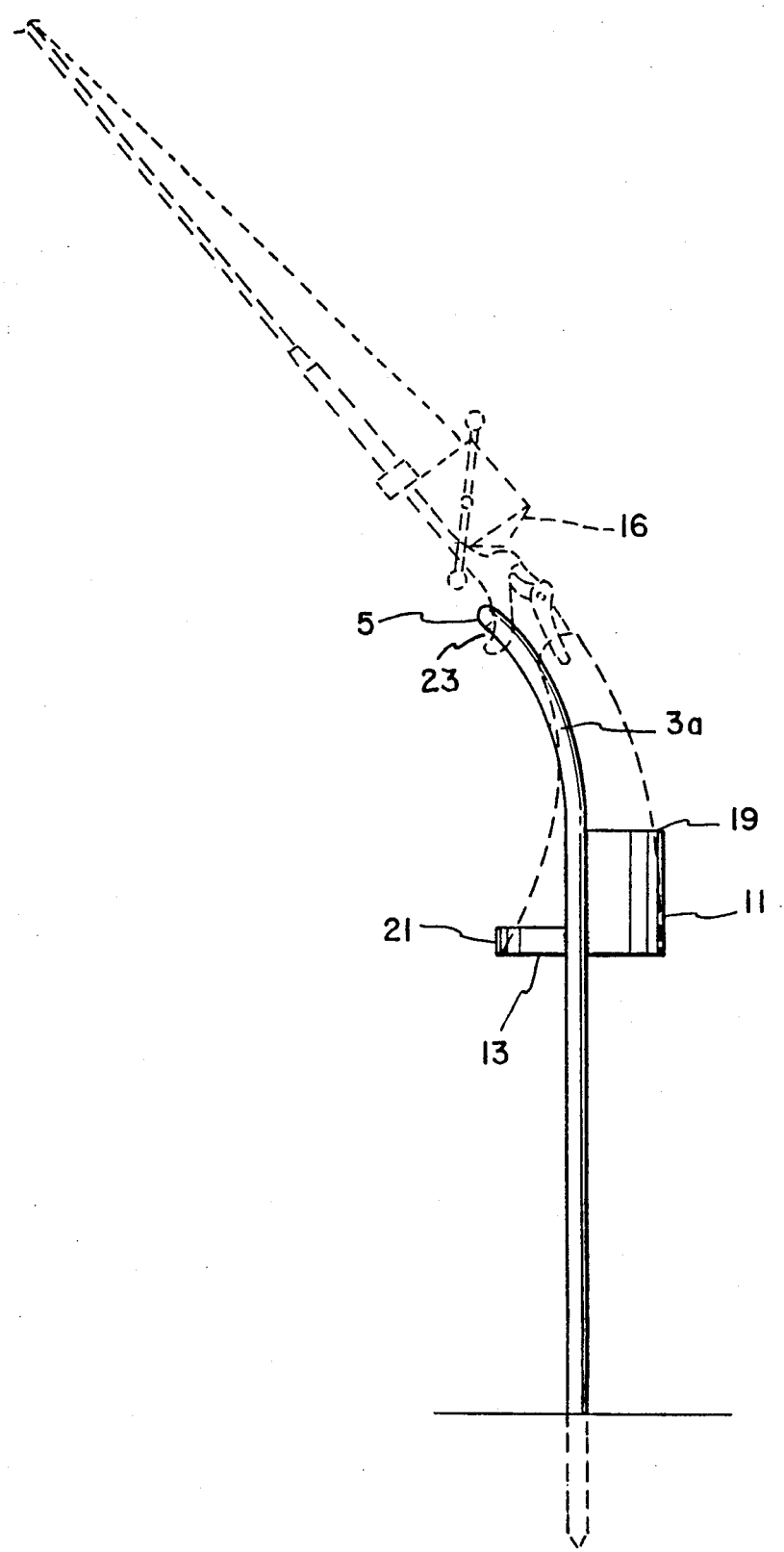
FIG. 2 shows a side view of an exemplary use of the pistol grip fishing pole stand.

FIG. 2 depicts and exemplary use of the pistol grip fishing pole stand. As can be seen from the drawing, the first and second portions 11 and 13 of the receptacle 9 receive and engage the handle of the fishing pole 16. The curved U-shaped connecting member 5 provides further support for the fishing pole 16 by engaging the fishing pole 16 at reference numeral 23. In this configuration, the sidewall of the first portion 11 at reference numeral 19 effectively engages and retains the handle of the fishing pole 16 in place. The lower sidewall of the second portion 13 facilitates removal and placement of the fishing pole handle in the receptacle 9 as well as engaging the handle at referene numeral 21.

The pistol grip fishing pole stand may be made out of any material, with a preferred material being a metallic material such as steel or brass. Furthermore, it should be understood that the receptacle 9 may be attached to the frame member 1 at a distance from the U-shaped connecting member 5 equal to about one-third of the overall length of the frame member 1. This positioning of the receptacle 9 facilitates supporting the pistol grip fishing pole by the U-shaped connecting member 5.

The inventive pistol grip fishing pole stand provides improvements over other prior art devices in that it permits a fisherman to place a pistol grip fishing pole within the stand and fish without having to hold the fishing pole. Furthermore, the pistol grip fishing pole stand permits the fisherman to jerk the pole or the line to hook a fish without having to remove the fishing pole from the stand.

As such, an invention has been disclosed in terms of a preferred embodiment thereof which fulfills each and every one of the objects of the invention as set forth hereinabove and provides a new and improved pistol grip fishing pole stand of great novelty and utility.

Of course, various changes, modifications and alterations in the teachings of the present invention may be contemplated by those skilled in the art with departing from the intended spirit and scope thereof. As such, it is intended that the present invention only be limited by the terms of the appended claims.

I claim:

1. A fishing pole stand for a fishing pole having a pistol handle shaped handle comprising:

(a) a frame member;
(b) a receptacle attached to said frame member, said receptacle further comprising:
  (i) a first sidewall;
  (ii) a second sidewall; and
  (iii) a base;
  (iv) said first sidewall, second sidewall and said base forming a generally elliptically shaped chamber to engage and support said pistol handle shaped handle pole;
  (v) said first sidewall having a height greater than said second sidewall to aid in preventing removal of said pistol handle shaped handle during unattended fishing.

2. The invention of claim 1, wherein said frame member further comprises:

(a) a pair of leg members; and
(b) a member connecting one end of each leg member together;
(c) whereby each said leg member is designed to be inserted into a ground surface to provide support for said fishing pole stand.

3. The invention of claim 2, wherein said member connecting said ends of each said leg together further comprises a U-shaped member, said U-shaped member providing further support for a portion of a said fishing pole.

4. The invention of claim 1, wherein said fishing pole stand is made of a metallic material.

5. The invention of claim 4, wherein said receptacle is welded to said frame member.

* * * * *